(12) United States Patent
Brill et al.

(10) Patent No.: US 6,817,633 B2
(45) Date of Patent: Nov. 16, 2004

(54) TUBULAR MEMBERS AND THREADED CONNECTIONS FOR CASING DRILLING AND METHOD

(75) Inventors: Leland M. Brill, Hughes Spring, TX (US); Bluford W. Lowery, Linden, TX (US); Edmond L. Miller, Bowie County, TX (US)

(73) Assignee: Lone Star Steel Company, Dallas, TX (US)

( * ) Notice: Subject to any disclaimer, the term of this patent is extended or adjusted under 35 U.S.C. 154(b) by 24 days.

(21) Appl. No.: 10/325,050

(22) Filed: Dec. 20, 2002

(65) Prior Publication Data

US 2004/0118569 A1 Jun. 24, 2004

(51) Int. Cl.$^7$ ................................................ F16L 35/00
(52) U.S. Cl. .................. 285/333; 285/390; 285/148.19
(58) Field of Search ........................... 285/148.19, 333, 285/334, 390, 355

(56) References Cited

U.S. PATENT DOCUMENTS

| | | | | | |
|---|---|---|---|---|---|
| 196,904 | A | * | 11/1877 | Ingersoll | 285/148.13 |
| 964,353 | A | * | 7/1910 | Whittier | 285/148.1 |
| 1,134,092 | A | * | 4/1915 | Bahr | 285/32 |
| 1,731,171 | A | * | 10/1929 | Perkins | 285/123.1 |
| 1,947,909 | A | * | 2/1934 | Hollander | 138/44 |
| RE19,196 | E | * | 6/1934 | Hinderliter | 285/106 |
| 2,122,757 | A | * | 7/1938 | Scott | 285/334 |
| 2,150,221 | A | * | 3/1939 | Hinderliter | 285/332.3 |
| 2,205,697 | A | * | 6/1940 | Scharpenberg | 285/237 |
| 2,211,173 | A | | 8/1940 | Shaffer | 285/146 |
| 2,812,025 | A | | 11/1957 | Teague et al. | 166/207 |
| 3,397,745 | A | | 8/1968 | Owens et al. | 166/57 |
| 3,463,228 | A | | 8/1969 | Hearn | 166/181 |
| 3,489,437 | A | | 1/1970 | Duret | 285/55 |
| 3,508,771 | A | | 4/1970 | Duret | 285/334 |

(List continued on next page.)

FOREIGN PATENT DOCUMENTS

WO        99/18328        4/1999        .......... E21B/23/01

OTHER PUBLICATIONS

American Petroleum Institute's, "Specification for Threading, Gauging, and Thread Inspection of Casing, Tubing, and Line Pipe Threads (U.S. Customary Units)," API Specification Standard 5B, Fourteenth Edition, 30 pages, 8/96.

(List continued on next page.)

Primary Examiner—Eric K. Nicholson
(74) Attorney, Agent, or Firm—Baker Botts L.L.P.

(57) ABSTRACT

Oil country tubular goods and other types of tubular members are provided with threaded and coupled connections satisfactory for use in drilling and completing wellbores. The threaded and coupled connections are used to join sections of casing with each other to form a casing string which may be used to drill and complete a wellbore. Each tubular member has first and second pin ends with approximately the same thread form and thread profile with different pitch diameters. Standard API couplings may be used with the casing string.

22 Claims, 3 Drawing Sheets

U.S. PATENT DOCUMENTS

| | | | | |
|---|---|---|---|---|
| 3,567,254 A | * | 3/1971 | Parssinen | 403/307 |
| 3,572,777 A | | 3/1971 | Blose et al. | 285/334 |
| 3,574,357 A | | 4/1971 | Trigoviste et al. | 285/47 |
| 3,581,817 A | | 6/1971 | Kammerer, Jr. | 166/208 |
| 3,678,727 A | | 7/1972 | Jackson | 72/367 |
| 3,826,124 A | | 7/1974 | Baksay | 72/367 |
| 3,830,294 A | | 8/1974 | Swanson, Jr. | 166/51 |
| 3,830,295 A | | 8/1974 | Crowe | 166/125 |
| 3,874,446 A | | 4/1975 | Crowe | 166/129 |
| 3,915,763 A | | 10/1975 | Jennings et al. | 148/127 |
| 3,963,076 A | | 6/1976 | Winslow | 166/278 |
| 4,018,634 A | | 4/1977 | Fencl | 148/131 |
| 4,397,484 A | | 8/1983 | Miller | 285/81 |
| 4,445,265 A | * | 5/1984 | Olson et al. | 29/447 |
| 4,458,925 A | | 7/1984 | Raulins et al. | 285/332.2 |
| 4,483,399 A | | 11/1984 | Colgate | 166/308 |
| 4,495,073 A | | 1/1985 | Beimgraben | 210/448 |
| 4,508,167 A | | 4/1985 | Weinberg et al. | 166/120 |
| 4,531,552 A | | 7/1985 | Kim | 138/149 |
| 4,538,442 A | | 9/1985 | Reed | 72/367 |
| 4,582,348 A | | 4/1986 | Dearden et al. | 285/175 |
| 4,603,889 A | | 8/1986 | Welsh | 285/175 |
| 4,676,563 A | | 6/1987 | Curlett et al. | 439/194 |
| 4,762,344 A | | 8/1988 | Perkins et al. | 285/175 |
| 4,799,544 A | | 1/1989 | Curlett | 166/65.1 |
| 4,825,674 A | | 5/1989 | Tanaka et al. | 72/98 |
| 4,836,278 A | | 6/1989 | Stone et al. | 166/115 |
| 4,838,349 A | | 6/1989 | Berzin | 166/187 |
| 4,846,508 A | * | 7/1989 | Pallini, Jr. | 285/148.19 |
| 4,921,045 A | | 5/1990 | Richardson | 166/134 |
| 4,924,949 A | | 5/1990 | Curlett | 175/25 |
| 5,048,871 A | | 9/1991 | Pfeiffer et al. | 285/39 |
| 5,174,340 A | | 12/1992 | Peterson et al. | 138/110 |
| 5,249,628 A | | 10/1993 | Surjaatmadia | 166/308 |
| RE34,467 E | | 12/1993 | Reeves | 285/334 |
| 5,348,095 A | | 9/1994 | Worrali et al. | 166/380 |
| 5,360,239 A | * | 11/1994 | Klementich | 285/94 |
| 5,361,836 A | | 11/1994 | Sorem et al. | 166/187 |
| 5,366,012 A | | 11/1994 | Lohbeck | 166/277 |
| 5,388,648 A | | 2/1995 | Jordan, Jr. | 166/380 |
| 5,667,011 A | | 9/1997 | Gill et al. | 166/295 |
| 5,901,789 A | | 5/1999 | Donnelly et al. | 166/381 |
| 5,933,945 A | | 8/1999 | Thomeer et al. | 29/825 |
| 5,964,288 A | | 10/1999 | Leighton et al. | 166/207 |
| 5,984,568 A | | 11/1999 | Lohbeck | 403/375 |
| 6,012,522 A | | 1/2000 | Donnelly et al. | 166/276 |
| 6,024,181 A | | 2/2000 | Richardson et al. | 175/162 |
| 6,070,671 A | | 6/2000 | Cumming et al. | 166/381 |
| 6,253,846 B1 | | 7/2001 | Nazzai et al. | 166/242.2 |
| 6,253,850 B1 | | 7/2001 | Nazzai et al. | 166/277 |
| 6,263,966 B1 | | 7/2001 | Haut et al. | 166/278 |
| 6,263,968 B1 | | 7/2001 | Freeman et al. | 166/313 |
| 6,263,972 B1 | | 7/2001 | Richard et al. | 166/381 |
| 6,273,634 B1 | | 8/2001 | Lohbeck | 403/297 |
| 6,286,558 B1 | | 9/2001 | Quigley et al. | 138/125 |
| 6,311,792 B1 | | 11/2001 | Scott et al. | 175/162 |
| 6,315,040 B1 | | 11/2001 | Donnelly | 166/207 |
| 6,318,457 B1 | | 11/2001 | Den Boer et al. | 166/66.7 |
| 6,328,113 B1 | | 12/2001 | Cook | 166/387 |
| 6,334,351 B1 | | 1/2002 | Tsuchiya | 72/370.06 |
| 6,443,247 B1 | | 9/2002 | Wardley | 175/402 |
| 6,447,025 B1 | | 9/2002 | Smith | 285/333 |
| 6,454,024 B1 | | 9/2002 | Nackerud | 175/57 |

OTHER PUBLICATIONS

Joe Haberer's "New Solutions May Ease Hardbanding Controversy," Drilling Contractor, 2 pages, Sep./Oct. 2000.

Joe Haberer's "Viable Drill Pipe Hardbanding Strategies are Outlined," Drilling Contractor, 2 pages, Nov./Dec. 2000.

Rigzone's, "Tesco Provides Casing Drilling Operations Update" at internet address http://www.rigzone.com/news/article.asp?a_id=1755, 2 pages, Oct. 16, 2001.

Rigzone's, "Conoco and Tesco Unveil Revolutionary Drilling Rig" at internet address http://www.rigzone.com/news/article.asp?a_id=2603, 2 pages, Feb.11, 2002.

Tesco Corporation's, "Casing Drilling™ Process" at internet address http://www.tescocorp.com/htmls/casing_drilling.html, 4 pages, Sep. 30, 2002.

Rick von Flatern, "Olified Service Trio Target Jules Verne Territory," at internet address http://www.oilonline.com/new/features/oe/20010817.oilfield.7127.asp, 9 pages, Aug. 17, 2001.

Ian D. Harris', "Tube Welding," at internet address http://www.tubenet.org.uk/technical/ewi.html, 6 pages, Dec. 9, 2002.

KSBEAR Premium Connection, JFE Steel Corporation at Internet, 8 pages http://www.life–steel.co.Ip/en/products/pipes/octg/pdf/KSBear.odf.

* cited by examiner

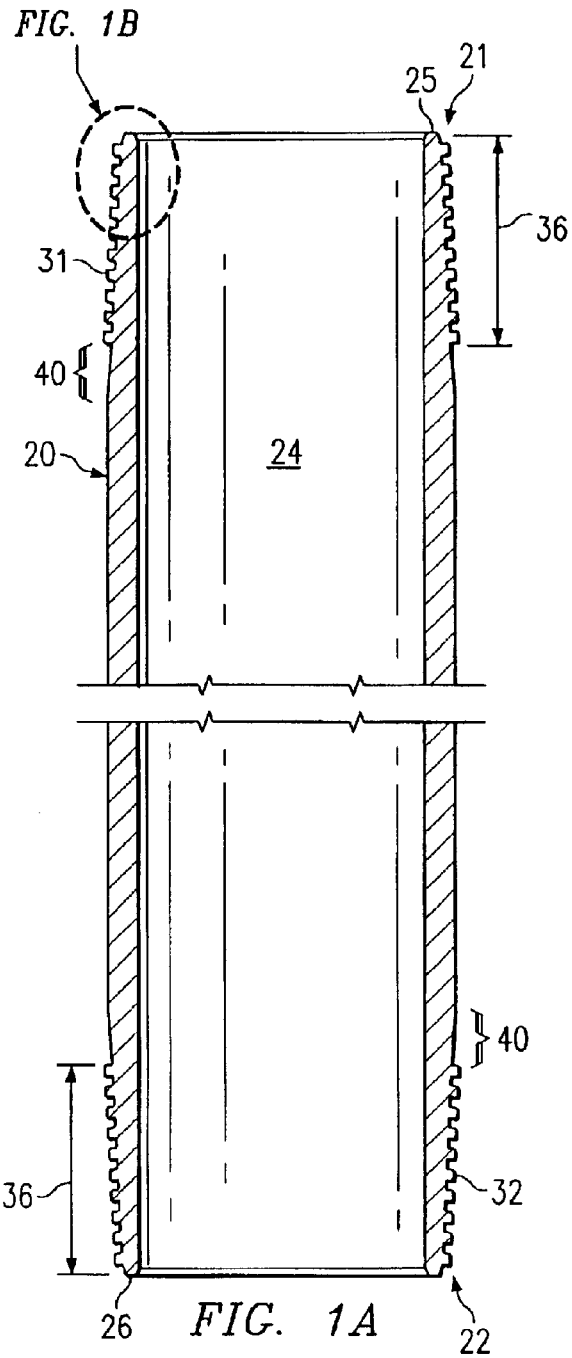
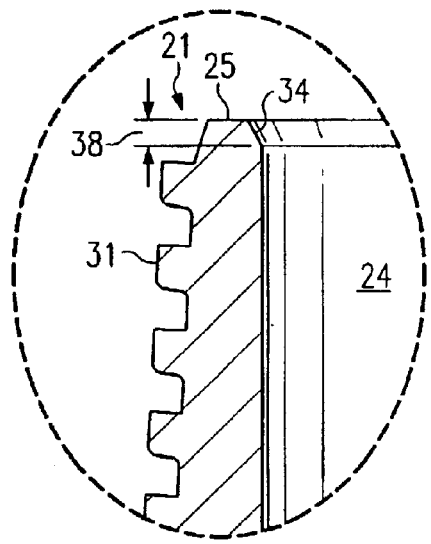
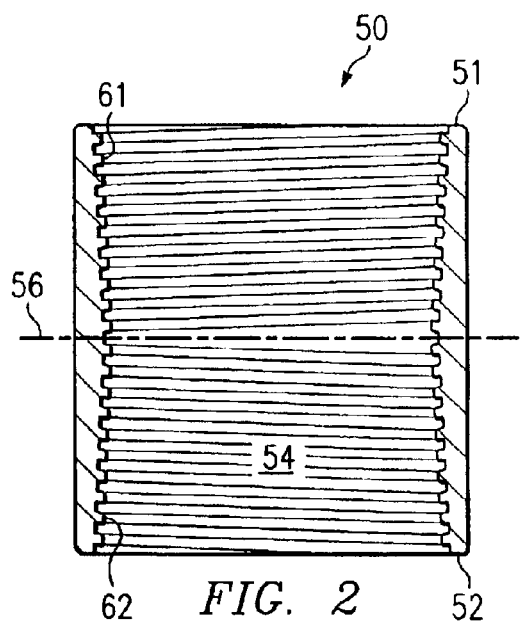
FIG. 1A
FIG. 1B
FIG. 2

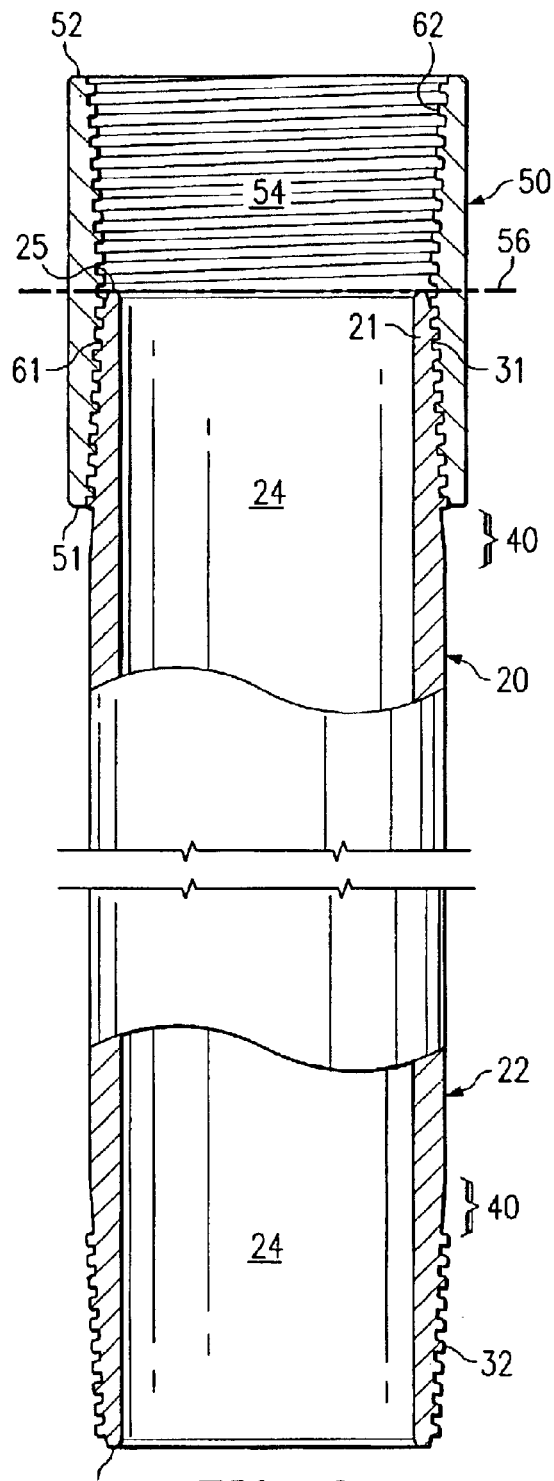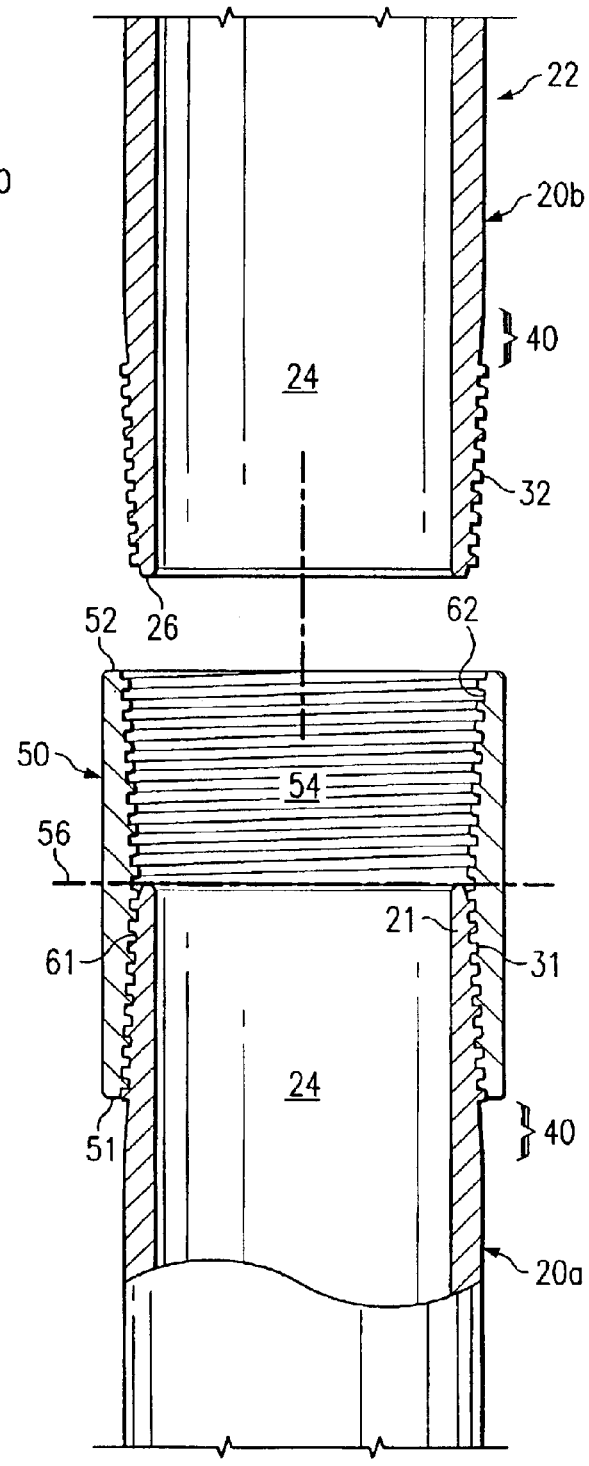
FIG. 3
FIG. 4

TUBULAR MEMBERS AND THREADED CONNECTIONS FOR CASING DRILLING AND METHOD

TECHNICAL FIELD

The present invention is related to apparatus and methods to drill and complete oil and gas wells. More particularly, the present invention is related to using a casing string to both drill a wellbore and complete the wellbore.

BACKGROUND OF THE INVENTION

Oil and gas wells and other types of wells such as geothermal wells are typically drilled from the well surface to a desired downhole location using a rotary drilling rig, drill pipe, and drill bits. Various types of bottom hole assemblies may also be used as required by associated geological formations. After a wellbore has been drilled to a desired depth or downhole location, one or more casing strings may then be installed extending from the well surface to the desired downhole location. A cement sheath or cement bond is typically formed between the outside diameter of each casing string and adjacent inside diameters of the wellbore. Many wells have two or more casing strings with different inside diameters installed in a telescoping manner from the well surface to a desired downhole location. For example, a first casing string may be installed from the well surface to a depth of 500 to 1,000 feet. The first casing string may have an outside diameter of nine and five/eighths inches (9⅝"). A second casing string may be installed extending from proximate the downhole end of the first casing string to a desired depth of 9,000 or 10,000 feet. The second casing string may have an outside diameter of approximately seven inches (7").

Wellbores for producing oil, gas or other formation fluids from selected subsurface formations, are typically drilled in stages. For example, a wellbore may be first drilled with a drill string and a first drill bit having particular diameter. At a desired depth for a first portion of the wellbore, the drill string and drill bit are removed from the wellbore. Tubular members of smaller diameter, often referred to as casing or a casing string, may then be placed in the first portion of the wellbore. An annulus formed between the inside diameter of the wellbore and the outside diameter of the casing string is generally filled with cement. The cement provides support for the casing and isolates downhole formations or subterranean strata from each other. Often, the next step in drilling the wellbore is to pass the drill string with a second, smaller diameter drill bit through the first casing string and drill another portion of the wellbore to a selected depth beyond the depth of the first casing string. This sequence of drilling wellbores and installing casing strings may be repeated as many times as necessary, with smaller and smaller components until the ultimate desired depth or downhole location of the wellbore has been achieved.

The cost of drilling and completing wellbores, particularly in offshore regions, is extremely expensive. Typical operating costs for an offshore drilling rig may easily exceed $100,000 per day. Thus, there are substantial benefits to minimizing the length of time required to drill a wellbore. At extended distances from the well surface (15,000 feet or greater) round trip time required to pull a drill bit and replace it with another drill bit may be several hours. The associated trip time is often non-productive and wasteful.

For very deep wells or very long wells (20,000 feet or greater), there may be three or four changes in casing diameter from the well surface to the total depth or desired downhole location of the wellbore. Each change in diameter of the casing string results in a corresponding decrease in the diameter of production tubing used to produce formation fluids from selected downhole formations. The change in casing diameter associated with typical deep wells and/or long wells results in significantly increased drilling and completion costs.

During the past several years an increasing number of oil and gas wells have been drilled using standard oilfield casing rather than drill pipe. Standard oilfield casing generally has less wall thickness when compared with standard drill pipe. Drill bits and other downhole tools used to drill wells have been modified to allow installation and removal from downhole locations through a casing string using wireline techniques. For example, drill bits may be inserted through the longitudinal bore of a casing string and releasably latched adjacent to and extending from the end of to the last joint of a casing string using wireline techniques. Such drill bits may also be removed from the end of the casing string using similar wireline techniques when the wellbore has been drilled to a desired downhole location. The casing string may then be cemented within the wellbore to form a portion of the well completion system.

Drilling a wellbore with a casing string eliminates or substantially reduces the number of times which pipe must be removed and inserted (tripped) from the wellbore. Drilling a well using a casing string generally reduces drilling costs and completion costs as compared with drilling a well with conventional drill pipe and using conventional completion techniques to install a casing string in the resulting wellbore.

SUMMARY OF THE INVENTION

In accordance with teachings of the present invention, threaded connections are provided for use on casing and other tubular goods used for drilling and completing wellbores. One aspect of the present invention includes providing tubular goods with threaded and coupled connections which may be used to releasably engage the tubular goods with each other to allow drilling a wellbore and completion the wellbore.

Technical benefits of the present invention include providing a casing string with threaded and coupled connections that enhance use of the casing string to drill a wellbore and complete the wellbore without removing or tripping the casing string. The threaded and coupled connection may be substantially stronger and more rugged than conventional threaded connections used on oilfield casing. A threaded connection formed in accordance with teachings of the present invention provides mechanical strength required to drill a wellbore and provides fluid, pressure tight seals between the interior and the exterior of the casing string. Since the wall thickness of a casing string is generally less than the wall thickness of conventional drill pipe, threaded and coupled connections formed in accordance with teachings of the present invention provided desired mechanical strength in threaded portions where the wall thickness is often reduced as compared with other portions of the casing string.

Further technical benefits of the present invention include providing one or more mechanical surfaces on the exterior of a casing string to accommodate applying hardfacing to selected portions of the casing string. Hardfacing selected portions of a casing string may be desired when the casing string is used to drill a wellbore.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 1A is a schematic drawing in section with portions broken away of a tubular member having a first pin end and a second pin end with respective thread profiles formed in accordance with teachings of the present invention;

FIG. 1B is an enlarged schematic drawing in section with portions broken away showing a chamfer formed on the first pin end of the tubular member of FIG. 1A;

FIG. 2 is a schematic drawing in section with portions broken away of a coupling having a first box end and a second box end with respective thread profiles formed in accordance with teachings of the present invention;

FIG. 3 is a schematic drawing in section with portions broken away of a tubular member and a coupling releasably engaged with each other in accordance with teachings of the present invention;

FIG. 4 is a schematic drawing in section with portions broken away showing a first tubular member and a coupling releasably engaged with each other in accordance with teachings of the present invention and a second tubular member by a having a threaded pin end formed in accordance with teachings of the present invention;

FIG. 6 is a schematic drawing in section with portions broken away showing the field end of a tubular member and an attached coupling incorporating teachings of the present invention between.

DETAILED DESCRIPTION OF THE INVENTION

Figure 5:
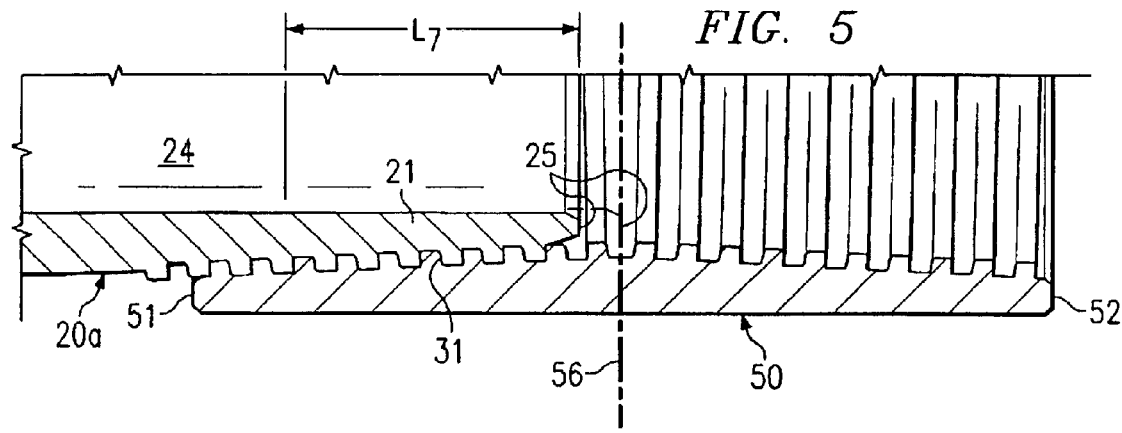
FIG. 5 is a schematic drawing in section with portions broken away showing the mill end of a tubular member and an attached coupling incorporating teachings of the present invention.

Preferred embodiments of the invention and its advantages are best understood by reference to FIGS. 1A–7 wherein like numbers refer to same and like parts.

The term "oil country tubular goods" and "OCTG" are used in this application to include casing, tubing, pup joints, couplings and any other type of pipe or tubular member associated with drilling, producing or servicing oil wells, natural gas wells, geothermal wells or any other subsurface wellbore.

The terms "welded pipe" and "welded tubular goods" are used in this application to include any pipe or tubular member manufactured from rolled steel or steel strips or steel strips which passed through forming rollers to create a longitudinal butt joint and was welded along the longitudinal butt joint. The resulting longitudinal butt weld or longitudinal seam weld may be formed using various techniques such as electric resistance welding (ERW), arc welding, laser welding, high frequency induction welding and other techniques satisfactory for producing longitudinal seam welds. Welded pipe and welded tubular members may be produced in individual links or may be produced in continuous links from coiled skelp and subsequently cut into individual links.

Various aspects of the present invention will be described with respect to tubular members which have been formed using electric resistant welding (ERW) technology. However, the present invention is not limited to use with tubular members produced by ERW technology. A wide variety of tubular members and oil country tubular goods (OCTG) may be releasably engaged with each other by threaded connections formed in accordance with teachings of the present invention.

Various aspects of the present invention will be described with respect to tubular members 20 and couplings 50 as shown in FIGS. 1A–7. To describe some features of the present invention, tubular members 20 may sometimes be designated as 20a and 20b. For some applications, tubular members 20 may be sections of a casing string used to both drill and complete a wellbore (not expressly shown). For such applications, each tubular member 20 may have substantially the same overall dimensions and configurations as associated with a conventional oil field casing string. For other applications, one or more tubular members (not expressly shown) with dimensions and configurations associated with a bottom hole assembly (not expressly shown) used to drill oil and gas wells may have threaded portions corresponding with tubular members 20. Also, one or more tubular members 20 may have a configuration and dimensions associated with liner hangers (not expressly shown) or other components used to complete oil and gas wells.

FIG. 1 shows tubular member 20 which may be formed using electric resistance welding (ERW) technology. For this embodiment, tubular member 20 may be generally described as an elongated, hollow section of casing. Tubular member 20 includes first end 21 and second end 22 with longitudinal bore 24 extending therethrough. Respective thread profiles 31 and 32 incorporating teachings of the present invention are preferably formed on respective first end 21 and second end 22 of tubular member 20. First end 21 and second end 22 may sometimes be referred to as "pin ends". As discussed later in more detail, portions of first thread profile 31 and second thread profile 32 may generally correspond with standard American Petroleum Institute (API) buttress threads for oil country tubular goods. API Specification Standard 5B contains detailed information for casing threads.

First end or pin end 21 of tubular member 20 may be described as the "mill end". Second end or pin end 22 may be described as the "field end". The relationship between mill end 21, field end 22 and coupling 50 are shown in more detail in FIGS. 5, 6 and 7. Various features associated with external thread profiles 31 and 32 will be described with respect to center plane 56 of associated coupling 50.

Coupling 50, as shown in FIG. 2, may have the same overall dimensions and configuration associated with standard API couplings for oil country tubular goods. Coupling 50 may be described as a relatively short section of pipe defined in part by first end 51 and second end 52 with longitudinal bore 54 extending therebetween. Matching internal thread profiles 61 and 62 may be formed within longitudinal bore 54 extending respectively from first end 51 and second end 52. Center plane 56 defines approximately the middle of coupling 50 where internal thread profiles 61 and 62 meet. For some applications, thread profiles 61 and 62 may be standard API buttress threads for oil country tubular goods as described in API Specification Standard 5B. Imperfect thread areas associated with forming internal thread profiles 61 and 62 of coupling 50 are controlled to ensure that there is no interference with any imperfect threads during make up of field end 22 with a mill end 21 of respective tubular members 20 within longitudinal bore 54.

Tubular member 20 with coupling 50 attached thereto in accordance with the teachings of the present invention is shown in FIG. 3. For some applications, tubular member 20 may be initially formed with blank ends (not expressly shown). Respective thread profiles 31 and 32 may then be formed on first pin end 21 and second pin end 22 using conventional pipe threading machines and equipment (not expressly shown). During the manufacturing process associated with forming thread profiles 31 and 32, coupling 50 may be releasably engaged with first pin end 21. Tubular member 20 will then be shipped from the manufacturing facility with coupling 50 releasably engaged with first pin end 21. Therefore, first pin end 21 with coupling 50 attached thereto may sometimes be referred to as the "factory end."

Various types of powered tools and equipment (not expressly shown) may be satisfactorily used to releasably engage coupling 50 with first thread profile 31 of pin end 21. As previously noted, coupling 50 preferably has matching internal thread profiles 61 and 62. Therefore, either first end 51 or second end 52 of coupling 50 may be releasably engaged with first pin end 21. For purposes of describing various features of the present invention, the process of making up or releasably engaging coupling 50 with first pin end 21 will be described with respect to end 51. In a similar manner, releasable engagement of second pin end 22 with coupling 50 will be described with respect to second end 52. However, first pin end 21 may be satisfactorily engaged with second end 52 of coupling 50 and second pin end 22 may be satisfactorily engaged with first end 51 of coupling 50.

FIG. 4 shows a typical orientation of first tubular member 20a and second tubular member 20b prior to making up the tubular members on a drilling platform (not expressly shown). The present invention allows multiple tubular members 20 to be releasably engaged with each other to form a casing string for drilling and completing a wellbore (not expressly shown). Generally, first tubular member 20a will be positioned by the drilling platform over a wellbore with second end or box end 52 looking up to receive second pin end or field end 22 of second tubular member 20b. Various types of pipe tongs and other equipment associated with making and breaking treaded connections between oil country tubular goods may be satisfactorily used to releasably engage second pin end 22 of second tubular member 20b with second end or box end 52 of coupling 50. Various details associated with releasably engaging second pin end 22 of second tubular member 20b with coupling 50 and first tubular member 20a will be discussed later in more detail.

For the embodiments of the present invention as shown in FIGS. 1A–7, thread profiles 31 and 32 may be generally described as modified API buttress threads having standard API buttress thread forms associated with oil field casing. However, thread profiles 31 and 32 formed in accordance with teachings of the present invention preferably include several significant differences as compared with corresponding API buttress threads. For example, length 36 of each thread profile 31 and 32 is preferably selected to be longer than the length of a corresponding standard API buttress thread having approximately the same overall dimensions and configuration. Length 36 for thread profile 31 is measured from extreme end 25 of first pin end 21 to a plane extending normal to longitudinal bore 24 the last vanishing thread of thread profile 31. Length 36 of thread profile 32 is measured from extreme end 26 to a plane extending normal to longitudinal bore 24 at the last vanishing thread of thread profile 32. See FIG. 1A.

For casing threads formed in accordance with API Specification Standard 5B this same length is often defined as dimension "$L_4$". Length 36 of respective thread profiles 31 and 32 is preferably selected such that extreme end 25 of first pin end 21 will abut extreme end 26 of second pin end 22 when respective thread profiles 31 and 32 are engaged with coupling 50. See FIGS. 5, 6 and 7.

Casing threads and casing connections as defined in API specification standard 5B may be made up to a "basic hand-tight position" and to a "basic power-tight position" as indicated by markings on the exterior of the casing sections and couplings. The hand tight position for factory end or first pin end 21 relative to coupling 50 is shown by solid lines in FIG. 5. The power tight position for factory end or first pin end 21 relative to coupling 50 is shown by dotted lines in FIG. 5. The hand tight position for field end or second pin end 22 relative to coupling 50 is shown by solid lines in FIG. 6. The power tight position for field end or second pin end 22 relative to coupling 50 is shown by dotted lines in FIG. 6.

Figure 7:
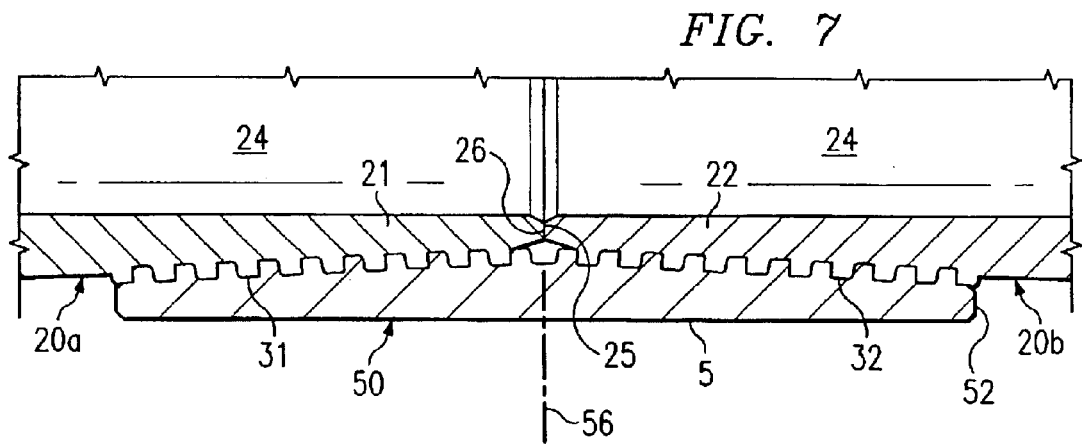
FIG. 7 is a schematic drawing in section with portions broken away showing the mill end of a first tubular member, the field end of a second tubular member and a coupling having threaded connections incorporating teachings of the present invention.

A threaded and coupled connection formed in accordance with teachings of the present invention preferably has a power-tight position defined in part by the extreme end of the field end of one tubular member directly contacting the extreme end of the mill end of another tubular member at approximately the mid-point or center plane of an associated coupling. The power-tight position for releasably engaging tubular members 20a, 20b and coupling 50 with each other is shown in FIG. 7.

Extreme end 26 of field end 22 of second tubular member 20b and extreme end 25 of mill end 21 of first tubular member 20a are in direct contact with each other at center plane 56 of coupling 50. This contact between extreme ends 25 and 26 creates adjoining or abutting radial torque shoulders located proximate center plane 56 of coupling 50. Direct contact between extreme ends 25 and 26 ensures that all tortional forces exerted during rotary drilling of a wellbore will be transmitted against adjacent tubular members 20a and 20b and not against the adjacent threads and/or coupling 50. Table 1 provides representative values of dimension $L_4$ (length 36) for mill ends and pin ends of tubular members with threaded connections formed in accordance with teachings of the present invention.

As shown in FIGS. 1A and 1B, respective chamfered surfaces 34 are preferably formed within longitudinal bore 24 at first end 21 and second end 22. For some applications chamfered surfaces 34 may extend at an angle of approximately sixty five degrees (65°) between the inside diameter of longitudinal bore 24 and respective extreme ends 25 and 26. Length 38 of each chamfered surface 34 is preferably limited to a maximum value of approximately one-quarter of an inch (¼") to maintain substantial bearing surfaces or bearing faces at respective extreme ends 25 and 26. As a result of increasing length 36 of thread profiles 31 and 32 and limiting length 38 of chamfered surfaces 34, a relatively wide, sturdy torque bearing surfaces are provided at the contact between adjacent field ends and mill ends of tubular members 20.

Frequently, the inside diameter at the pin ends of oil country tubular goods having API threads are reamed to ensure that the inside diameter adjacent to the associated thread profiles meets designed limitations. When thread profiles 31 and 32 are formed on respective mill end 21 and field ends 22 of tubular members 20, the inside diameter of longitudinal bore 24 is only deburred. Eliminating standard reaming steps associated with API casing threads helps maintain desired bearing surfaces at extreme ends 25 and 26.

As previously noted, external thread profiles 31 and 32 may be generally described as modified API buttress casing threads. Conventional API buttress casing threads have a specified length for the "perfect threads" which varies depending upon the size or nominal outside diameter of the associated casing. Also, API buttress threads have a required pitch diameter which varies based on the size or nominal outside diameter of the associated casing. The specified length for the perfect threads is frequently referred to as dimension $L_7$.

Figure 6:
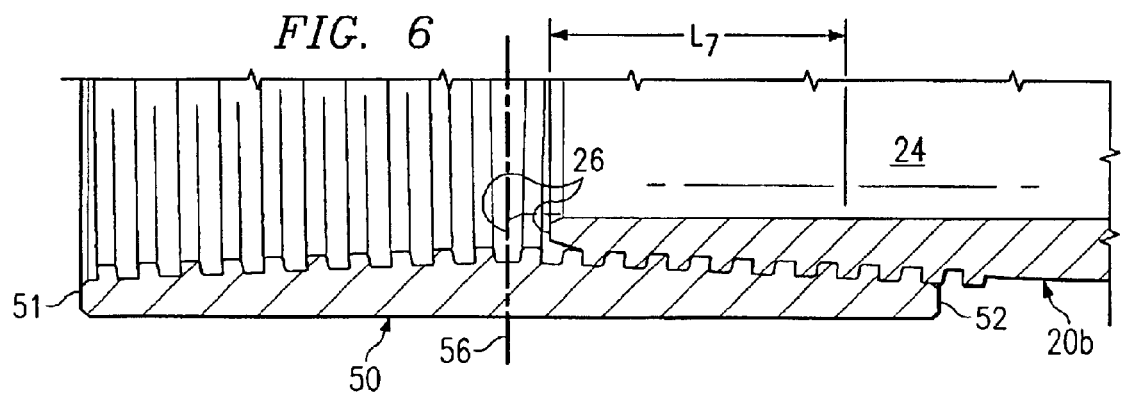

The perfect thread length (dimension $L_7$) at the specified thread diameter for thread profiles 31 and 32 are preferably mismatched. See TABLE 1. For the embodiment of the present invention as shown in FIGS. 5 and 6, the pitch diameter of thread profile 31 formed on mill end 21 may be approximately 0.006 inch larger than the pitch diameter of the thread profile 32 formed on field end 22. The difference in pitch diameters will typically result in a higher pressure during power make up of coupling 50 with mill end 21 as compared with the power make up of coupling 50 with field end 22. As a result of the pressure difference during power make up, a threaded and coupled connection such as shown in FIG. 7 will not rotate or turn during make up of field end 22 with box end 52 of coupling 50.

TABLE 1

EXAMPLES OF SOME TYPICAL THREAD DIMENSIONS
FOR EXTERNAL THREAD PROFILES 31 AND 32

MILL END PIN

| Size Outside Diameter | Major Diameter $D_4$ | No. of Threads Per Inch | Taper Per Foot Parallel to Cone | Length Imperfect Threads | Length Perfect Threads $L_7$ | Total Length of Threads $L_4$ (36) | End of Pipe to Center of Coupling Hand Tight |
|---|---|---|---|---|---|---|---|
| 4 ½ | 4.516 | 5 | 0.750 | 1.9840 | 1.8535 | 3.8375 | 0.600 |
| 7 | 7.016 | 5 | 0.750 | 1.9840 | 2.416 | 4.4000 | 0.600 |
| 9 ⅝ | 9.641 | 5 | 0.750 | 1.9840 | 2.7285 | 4.7125 | 0.600 |
| 13 ⅜ | 13.391 | 5 | 0.750 | 1.9840 | 2.7285 | 4.7125 | 0.600 |

| Size Outside Diameter | Maximum Length of Chamfer | Length End of Pipe to Triangle Stamp A1 | Length Face of Couple to | Coupling Length Min. | Diameter of Counter Bore Coupling | Maximum Length of Imperfect Threads in Center of Coupling J Area |
|---|---|---|---|---|---|---|
| 4 ½ | 0.250 | 4.437 | 1.884 | 8.875 | 4.640 | 0.250 |
| 7 | 0.250 | 5.000 | 1.784 | 10 | 7.140 | 0.250 |
| 9 ⅝ | 0.250 | 5.3125 | 1.784 | 10.625 | 9.765 | 0.250 |
| 13 ⅜ | 0.250 | 5.3125 | 1.784 | 10.625 | 13.515 | 0.250 |

FIELD END PIN

| Size Outside Diameter | Length Imperfect Threads $L_7$ | Length Perfect Threads $L_7$ | Total Length of Threads $L_4$ (36) | End of Pipe to Center of Coupling Hand Tight | Pitch Diameter at Length of Perfect Threads $L_7$ (E7) | End of Pipe to Center of Coupling Power Tight Make up |
|---|---|---|---|---|---|---|
| 4 ½ | 1.984 | 1.9535 | 3.9375 | 0.500 | 4.454 | 0.000 |
| 7 | 1.984 | 2.516 | 4.500 | 0.500 | 6.954 | 0.000 |
| 9 ⅝ | 1.984 | 2.8285 | 4.8125 | 0.500 | 9.579 | 0.000 |
| 13 ⅜ | 1.984 | 2.8285 | 4.8125 | 0.500 | 13.329 | 0.000 |

| Size Outside Diameter | Maximum Length of Chamfer | Length End of Pipe to Triangle Stamp A1 | Length Face of Coupling to plane (E7) | Coupling Length Min. | Diameter of Counter Bore Coupling | Maximum Length of Imperfect Threads in Center of Coupling J Area |
|---|---|---|---|---|---|---|
| 4 ½ | 0.250 | 4.437 | 1.884 | 8.875 | 4.640 | 0.250 |
| 7 | 0.250 | 5.000 | 1.784 | 10 | 7.140 | 0.250 |
| 9 ⅝ | 0.250 | 5.3125 | 1.784 | 10.625 | 9.765 | 0.250 |
| 13 ⅜ | 0.250 | 5.3125 | 1.784 | 10.625 | 13.515 | 0.250 |

Hardbanding is often applied to selected portions of conventional drill strings to reduce abrasive wear and resulting outside diameter reduction of associated tool joints and bottom hole assembly components. Hardbanding is often applied to preserve and extend the life of drill pipe, collars, and heavyweight components of a drill string. Hardbanding may be reapplied when previous applications or components experience excessive wear. Both research and field experience have demonstrated that applying tungsten carbide based hardbanding to tool joints and other components will reduce drill string wear.

During the past several years, oil and gas wells have routinely been drilled to much greater depths and/or longer lengths than was considered normal or typical when hardbanding was first developed for drill strings. Also, wellbore geometries have become much more complex including highly deviated, horizontal, multilateral, short-radius and extended reach wellbores. As a result of producing oil and gas reservoirs from deeper downhole locations and more remotely located geological formations, the number of rotating hours required to drill associated wellbores has substantially increased. Conventional hardbanding on drill strings may contribute to reduction of the wall thickness of casing strings, risers and other tubular members associated with drilling and completion of wellbores. In some cases, the reduction in wall thickness may result in forming holes which allow undesired fluid communication through damaged casing, risers or other well completion complements. As a result, new hardbanding materials and methods for applying hardbanding to various components of a drill string have been developed to substantially reduce or eliminate damage to casing, risers and other well completion components while at the same time providing desired protection for drill string components.

For some applications a slightly reduced outside diameter portion or machined portion 40 may be formed on first pin end 21 and second pin end 22 extending longitudinally from the last thread or vanishing thread of respective thread profiles 31 and 32. Reduced outside diameter portion 40 may be machined by a thread cutting tool (not expressly shown) for a selected longitudinal distance along the outside diameter of tubular member 20. For some applications reduced outside diameter portion 40 having a length of approximately one and one half inches (1½") may be formed on first end or mill end 21 of tubular member 20. A generally cylindrical, hollow sleeve or applique (not expressly shown) having substantially the same diameter as reduced outside diameter portion 40 may be disposed on the outside diameter portion 40 of tubular member 20. Engagement of coupling 50 with mill end 21 will result in trapping the sleeve or applique between the extreme end 51 or 52 of coupling 50 and the normal outside diameter portion of tubular member 20.

One or more layers of hardfacing material may be disposed on the sleeve. For some applications the sleeve may have a length of approximately one and one half inches (1½") which corresponds generally with the length of reduced outside diameter portion 40. The hardfacing material formed on the exterior of the sleeve may have a length of approximately one inch (1"). For some applications hardfacing sleeves may only be installed on a limited number of threaded and coupled connections such as the bottom five or six sections of casing or tubular members 20 used to drill and complete a wellbore.

Although the present invention and its advantages have been described in detail, it should be understood that various changes, substitutions and alternations can be made herein without departing from the spirit and scope of the invention as defined by the following claims.

What is claimed is:

1. A threaded connection for releasably coupling tubular members with each other, comprising:
   a coupling having a first box end and a second box end with a longitudinal bore extending through the coupling from the first box end to the second box end;
   a first internal thread profile formed within the first box end of the coupling;
   a second internal thread profile formed within the second box end of the coupling;
   each tubular member having a respective first pin end and a respective second pin end;
   a longitudinal bore extending through each tubular member from the respective first end to the respective second end;
   a first external thread profile formed on the first pin end and a second external thread profile formed on the second pin end;
   the first external thread profile having a pitch diameter larger than a pitch diameter of the second external thread profile; and
   the pitch diameter of the first external thread profile approximately 0.006 inches larger than the pitch diameter of the second external thread profile.

2. A threaded connection for releasably coupling tubular members with each other, comprising;
   a coupling having a first box end and a second box end with a longitudinal bore extending through the coupling from the first box end to the second box end;
   a first internal thread profile formed within the first box end of the coupling;
   a second internal thread profile formed within the second box end of the coupling;
   each tubular member having a respective first pin end and a respective second pin end;
   a longitudinal bore extending through each tubular member from the respective first end to the respective second end;
   a first external thread profile formed on the first pin end and a second external thread profile formed on the second pin end;
   the first external thread profile having a pitch diameter larger than a pitch diameter of the second external thread profile;
   the coupling having a center plane disposed proximate the middle of the coupling and the associated longitudinal bore;
   the first internal thread profile of the coupling having a first length extending through the longitudinal bore of the coupling from a first extreme end of the coupling to the center plane;
   the second internal thread profile of the coupling having a second length extending through the longitudinal bore of the coupling from a second extreme end to coupling to the center plane;
   the first length of the first internal thread profile approximately equal to the second length of the second internal thread profile;
   the first external thread profile having a length extending from an extreme end of the first pin end to a plane corresponding with the last thread of the first external thread profile;
   the length of the first external thread profile approximately equal to the first length of the first internal thread profile;
   the second external thread profile having a length extending from an extreme end of the second pin end to a plane corresponding with the last thread of the second thread profile; and
   the length of the second external thread profile approximately equal with the second length of the second internal thread profile.

3. A threaded connection for releasably coupling tubular members with each other, comprising:
   a coupling having a first box end and a second box end with a longitudinal bore extending through the coupling from the first box end to the second box end;
   a first internal thread profile formed within the first box end of the coupling;
   a second internal thread profile formed within the second box end of the coupling;
   each tubular member having a respective first pin end and a respective second pin end;
   a longitudinal bore extending through each tubular member from the respective first end to the respective second end;
   a first external thread profile formed on the first pin end and a second external thread profile formed on the second pin end;
   the first external thread profile having a pitch diameter larger than a pitch diameter of the second external thread profile;
   the extreme end of the first pin end of one tubular member directly abutting the extreme end of the second pin end of another tubular member proximate the center plane of the coupling; and
   contact of the first pin end with the second pin end directly transmitting torsional forces exerted on the one tubular member during drilling of a wellbore to the other tubular member.

4. A threaded connection for releasably coupling tubular members with each other, comprising:
   a coupling having a first box end and a second box end with a longitudinal bore extending through the coupling from the first box end to the second box end;
   a first internal thread profile formed within the first box end of the coupling;
   a second internal thread profile formed within the second box end of the coupling;

each tubular member having a respective first pin end and a respective second pin end;

a longitudinal bore extending through each tubular member from the respective first end to the respective second end;

a first external thread profile formed on the first pin end and a second external thread profile formed on the second pin end;

the first external thread profile having a pitch diameter larger than a pitch diameter of the second external thread profile; and the first internal thread profile and the second internal thread profile having matching API buttress thread forms.

5. A threaded connection for releasably coupling tubular members with each other, comprising:

a coupling having a first box end and a second box end with a longitudinal bore extending through the coupling from the first box end to the second box end;

a first internal thread profile formed within the first box end of the coupling;

a second internal thread profile formed within the second box end of the coupling;

each tubular member having a respective first pin end and a respective second pin end;

a longitudinal bore extending through each tubular member from the respective first end to the respective second end;

a first external thread profile formed on the first pin end and a second external thread profile formed on the second pin end;

the first external thread profile having a pitch diameter larger than a pitch diameter of the second external thread profile; and the first external thread profile and the second external thread profile having matching API buttress thread forms.

6. A threaded connection for releasably coupling tubular members with each other, comprising:

a coupling having a first box end and a second box end with a longitudinal bore extending through the coupling from the first box end to the second box end;

a first internal thread profile formed within the first box end of the coupling;

a second internal thread profile formed within the second box end of the coupling;

each tubular member having a respective first pin end and a respective second pin end;

a longitudinal bore extending through each tubular member from the respective first end to the respective second end;

a first external thread profile formed on the first pin end and a second external thread profile formed on the second pin end;

the first external thread profile having a pitch diameter larger than a pitch diameter of the second external thread profile;

a first chamfer formed on the first pin end between the first thread of the first external thread profile and the extreme end of the first pin end;

a second chamfer formed on the second pin end between the first thread of the second external thread profile and the extreme end of the second pin end;

the first chamfer and the second chamfer having approximately equal lengths; and the length of the first chamfer and the second chamfer limited to a maximum value of one fourth of an inch.

7. A threaded connection formed between a first tubular member, a second tubular member and a coupling comprising:

the coupling having a first box end and second box end with a longitudinal bore extending through the coupling from the first box end to the second box end;

a first internal thread profile formed within the first box end of the coupling and extending to a center plane of the coupling;

a second internal thread profile formed within the second box end of the coupling and extending to the center plane;

the first tubular member having a first pin end and a second pin end;

the second tubular member having a first pin end and a second pin end;

the first tubular member and the second tubular member having respective longitudinal bores extending therethrough;

a first external thread profile formed on each first pin end and a second external thread profile formed on each second pin end;

the first external thread profile having a pitch diameter larger than a corresponding pitch diameter larger than a corresponding pitch diameter of the second external thread profile; and the larger pitch diameter of the first external thread profile resulting in higher fluid pressure during power make up of each first pin end with one of the box ends of the coupling as compared with power make up of each second pin end with the other box end of the coupling.

8. The threaded connection of claim 7 further comprising the pitch diameter of the first external thread profile approximately 0.006 inches larger than the pitch diameter of the second external thread profile.

9. The threaded connection of claim 7 further comprising:

the coupling having a center plane disposed proximate the middle of the coupling and its associated longitudinal bore;

each first external thread profile having a length extending from an extreme end of the first pin end to a plane corresponding with the last thread of the first thread profile; and the length of each first external thread profile approximately equal with the length of the longitudinal bore of coupling measured from an extreme end of the coupling to the center plane.

10. The threaded connection of claim 7 further comprising:

the coupling having a center plane disposed at approximately the middle of the coupling and its associated longitudinal bore;

the first external thread profile having a length extending from the extreme end of the first end to a plane corresponding with the last thread of the first thread profile; and the length of the first external thread profile approximately equal with a length of the longitudinal bore measured from an extreme end of the coupling to the center plane.

11. The threaded connection of claim 7 further comprising:
the first internal thread profile and the second internal thread profile having matching API buttress thread forms; and
the first external thread profile and the second external thread profile having API buttress thread forms matching the thread forms of the first internal thread profile and the second internal thread profile.

12. A section of casing for using in drilling and completing a wellbore comprising:
a first end and a second end with a respective pin formed on the first end and a respective pin formed on the second end;
a longitudinal bore extending through the section of casing between the first end and the second end;
a first external thread profile formed on the first end and a second external thread profile formed on the second end;
a coupling having a first box end and a second box end with a longitudinal bore extending through the coupling from the first box end to the second box end;
a first internal thread profile formed within the first box end of the coupling;
a second internal thread profile formed within the second box end of the coupling;
the first external thread profile having a pitch diameter larger than a pitch diameter of the second external profile;
the first external thread profile releasably engaged with one of the internal thread profiles of the coupling;
at least one reduced outside diameter portion formed on the section of casing extending from one of the external thread profiles; and
the reduced outside diameter portion comprises a length of one and one half inches.

13. A section of casing for using in drilling and completing a wellbore comprising:
a first end and a second end with a respective pin formed on the first end and a respective pin formed on the second end;
a longitudinal bore extending through the section of casing between the first end and the second end;
a first external thread profile formed on the first end and a second external thread profile formed on the second end;
a coupling having a first box end and a second box end with a longitudinal bore extending through the coupling from the first box end to the second box end;
a first internal thread profile formed within the first box end of the coupling;
a second internal thread profile formed within the second box end of the coupling;
the first external thread profile having a pitch diameter larger than a pitch diameter of the second external profile;
the first external thread profile releasably engaged with one of the internal thread profiles of the coupling;
the first external thread profile having a length extending from an extreme end of the first pin end to a plane corresponding with the last thread of the first thread profile;
the length of the first external thread profile approximately equal to one half the length of the longitudinal bore of the coupling;
the second external thread profile having a length extending from an extreme end of the second pin end to a plane corresponding with the last thread of the second thread profile; and
the length of the second thread profile approximately equal with one half of the length of the longitudinal bore of the coupling.

14. A section of casing for using in drilling and completing a wellbore comprising:
a first end and a second end with a respective pin formed on the first end and a respective pin formed on the second end;
a longitudinal bore extending through the section of casing between the first end and the second end;
a first external thread profile formed on the first end and a second external thread profile formed on the second end;
a coupling having a first box end and a second box end with a longitudinal bore extending through the coupling from the first box end to the second box end;
a first internal thread profile formed within the first box end of the coupling;
a second internal thread profile formed within the second box end of the coupling;
the first external thread profile having a pitch diameter larger than a pitch diameter of the second external profile;
the first external thread profile releasably engaged with one of the internal thread profiles of the coupling;
a first chamfer formed on the first pin end and a second chamfer formed on the second pin end;
the first chamfer extending between the extreme end of the first pin end and an inside diameter of the longitudinal bore;
the second chamfer extending between the extreme end of the second pin end and an inside diameter of the longitudinal bore;
the first chamfer having a length approximately equal to a length of the second chamfer; and
the length of the first chamfer and the length of the second chamfer approximately equal to or less than one fourth of an inch.

15. A section of casing for using in drilling and completing a wellbore comprising:
a first end and a second end with a respective pin formed on the first end and a respective pin formed on the second end;
a longitudinal bore extending through the section of casing between the first end and the second end;
a first external thread profile formed on the first end and a second external thread profile formed on the second end;
a coupling having a first box end and a second box end with a longitudinal bore extending through the coupling from the first box end to the second box end;
a first Internal thread profile formed within the first box end of the coupling;
a second internal thread profile formed within the second box end of the coupling;
the first external thread profile having a pitch diameter larger than a pitch diameter of the second external profile;
the first external thread profile releasably engaged with one of the internal thread profiles of the coupling; and the first internal thread profile of the coupling and the second internal thread profile of the coupling having approximately equal pitch diameters.

16. A method of forming a section of casing for use in drilling a wellbore, comprising:

forming a first, elongated tubular member having a first pin end and a second pin end with a longitudinal bore extending through the tubular member from the first pin end to the second pin end;

forming a first tapered exterior thread profile with a first pitch diameter on the first pin end of the tubular member;

forming a second exterior tapered thread profile with a second pitch diameter on the second pin end of the first tubular member;

forming the first pitch diameter larger than the second pitch diameter;

forming a coupling having a first end and a second end with a longitudinal bore through the coupling from the first end to the second end;

forming a third tapered thread profile within the longitudinal bore of the coupling extending from the first end to proximate a mid point in the longitudinal bore of the coupling;

forming a fourth tapered thread profile within the longitudinal bore of the coupling extending from the second end to proximate a mid point of the longitudinal bore of the coupling;

releasably engaging the first pin end of the first, elongated tubular member with one of the thread profiles of the coupling; and forming the first pitch diameter approximately 0.006 inches larger than the second pitch diameter.

17. The method of claim 16 further comprising forming the first, elongated tubular member using electric resistance welding techniques.

18. The method of claim 16 further comprising forming a reduced outside diameter on the first pin end extending from the last thread of the first tapered external thread profile.

19. A method of forming a section of casing for use in drilling a wellbore, comprising:

forming a first, elongated tubular member having a first pin end and a second pin end with a longitudinal bore extending through the tubular member from the first pin end to the second pin end;

forming a first tapered exterior thread profile with a first pitch diameter on the first pin end of the tubular member;

forming a second exterior tapered thread profile with a second pitch diameter on the second pin end of the first tubular member;

forming the first pitch diameter larger than the second pitch diameter;

forming a coupling having a first end and a second end with a longitudinal bore through the coupling from the first end to the second end;

forming a third tapered thread profile within the longitudinal bore of the coupling extending from the first end to proximate a mid point in the longitudinal bore of the coupling;

forming a fourth tapered thread profile within the longitudinal bore of the coupling extending from the second end to proximate a mid point of the longitudinal bore of the coupling;

releasably engaging the first pin end of the first, elongated tubular member with one of the thread profiles of the coupling; and forming the reduced outside diameter portion with a length of approximately one and one half inches extending longitudinally from the last thread of the first tapered external thread profile.

20. A method of forming a section of casing for use in drilling a wellbore, comprising:

forming a first, elongated tubular member having a first pin end and a second pin end with a longitudinal bore extending through the tubular member from the first pin end to the second pin end;

forming a first tapered exterior thread profile with a first pitch diameter on the first pin end of the tubular member;

forming a second exterior tapered thread profile with a second pitch diameter on the second pin end of the first tubular member;

forming the first pitch diameter larger than the second pitch diameter;

forming a coupling having a first end and a second end with a longitudinal bore through the coupling from the first end to the second end;

forming a third tapered thread profile within the longitudinal bore of the coupling extending from the first end to proximate a mid point in the longitudinal bore of the coupling;

forming a fourth tapered thread profile within the longitudinal bore of the coupling extending from the second end to proximate a mid point of the longitudinal bore of the coupling;

releasably engaging the first pin end of the first, elongated tubular member with one of the thread profiles of the coupling; and forming the first tapered external thread profile and the second tapered external thread profile with matching API thread forms.

21. A method of forming a section of casing for use in drilling a wellbore, comprising:

forming a first, elongated tubular member having a first pin end and a second pin end with a longitudinal bore extending through the tubular member from the first pin end to the second pin end;

forming a first tapered exterior thread profile with a first pitch diameter on the first pin end of the tubular member;

forming a second exterior tapered thread profile with a second pitch diameter on the second pin end of the first tubular member;

forming the first pitch diameter larger than the second pitch diameter;

forming a coupling having a first end and a second end with a longitudinal bore through the coupling from the first end to the second end;

forming a third tapered thread profile within the longitudinal bore of the coupling extending from the first end to proximate a mid point in the longitudinal bore of the coupling;

forming a fourth tapered thread profile within the longitudinal bore of the coupling extending from the second end to proximate a mid point of the longitudinal bore of the coupling;

releasably engaging the first pin end of the first, elongated tubular member with one of the thread profiles of the coupling;

forming a chamfer on the first pin end having a length equal to or less than one fourth of an inch; and forming a chamfer on the second pin end having a length approximately equal to or less than one fourth of an inch or less.

22. A method of forming a section of casing for use in drilling a wellbore, comprising:

forming a first, elongated tubular member having a first pin end and a second pin end with a longitudinal bore extending through the tubular member from the first pin end to the second pin end;

forming a first tapered exterior thread profile with a first pitch diameter on the first pin end of the tubular member;

forming a second exterior tapered thread profile with a second pitch diameter on the second pin end of the first tubular member;

forming the first pitch diameter larger than the second pitch diameter;

forming a coupling having a first end and a second end with a longitudinal bore through the coupling from the first end to the second end;

forming a third tapered thread profile within the longitudinal bore of the coupling extending from the first end to proximate a mid point in the longitudinal bore of the coupling;

forming a fourth tapered thread profile within the longitudinal bore of the coupling extending from the second end to proximate a mid point of the longitudinal bore of the coupling;

forming a second, elongated tubular member having a respective first pin end, second pin end, longitudinal bore, first tapered exterior thread profile and second tapered exterior thread profile corresponding generally with the first, elongated tubular member;

releasably engaging the second pin end of the second tubular with the other thread profile of the coupling; and making up the first pin of the first tubular member with the coupling as compared with the fluid pressure required to make up the second pin end of the second tubular member with the coupling.

* * * * *